United States Patent [19]

Tobery

[11] Patent Number: 4,962,640

[45] Date of Patent: Oct. 16, 1990

[54] APPARATUS AND METHOD FOR COOLING A GAS TURBINE VANE

[75] Inventor: Edward W. Tobery, West Chester, Pa.

[73] Assignee: Westinghouse Electric Corp., Pittsburgh, Pa.

[21] Appl. No.: 306,186

[22] Filed: Feb. 6, 1989

[51] Int. Cl.[5] .................... F02C 7/12

[52] U.S. Cl. .................... 60/39.02; 60/39.75; 60/39.83; 415/115; 416/96 A; 416/97 R

[58] Field of Search .................... 60/39.02, 39.75, 39.83; 416/96 A, 96 R, 97 R; 415/115, 116

[56] References Cited

U.S. PATENT DOCUMENTS

| | | | |
|---|---|---|---|
| 2,625,367 | 1/1953 | Rainbow et al. | 415/115 |
| 3,123,283 | 3/1964 | Leis . | |
| 3,275,294 | 9/1966 | Allen et al. | 415/115 |
| 3,356,340 | 12/1967 | Bobo | 415/116 |
| 3,535,873 | 10/1970 | Szydlowski . | |
| 3,540,810 | 11/1970 | Kercher | 416/90 |
| 3,551,068 | 12/1970 | Scalzo | 415/173 |
| 3,558,237 | 1/1971 | Wall . | |
| 4,193,738 | 3/1980 | Landis, Jr. et al. | 415/208.1 |
| 4,260,326 | 4/1981 | Scott et al. | 415/115 |
| 4,292,008 | 9/1981 | Grosjean et al. | 415/115 |
| 4,721,433 | 1/1988 | Piendel et al. | 415/115 |
| 4,861,228 | 8/1989 | Todman | 415/115 |

FOREIGN PATENT DOCUMENTS

| | | | |
|---|---|---|---|
| 1210254 | 2/1966 | Fed. Rep. of Germany | 415/115 |
| 2252581 | 5/1974 | Fed. Rep. of Germany | 415/115 |
| 787666 | 12/1957 | United Kingdom | 415/115 |

*Primary Examiner*—Donald E. Stout

[57] ABSTRACT

An apparatus and method are provided for preventing the plugging of cooling air distribution holes in a hollow gas turbine vane by particles entrained in the cooling air. The portion of the cooling air is bled from the vane and discharged into the hot gas downstream of the vane, the shunted bleed air carrying the entrained particles.

18 Claims, 3 Drawing Sheets

APPARATUS AND METHOD FOR COOLING A GAS TURBINE VANE

BACKGROUND OF THE INVENTION

1. Field of the Invention

The present invention relates to gas turbines. More specifically, the present invention relates to an apparatus and method for cooling a gas turbine vane which prevents the plugging, by airborne particles, of cooling air passages in the vane.

2. Description of the Prior Art

A gas turbine is comprised of a compressor section for compressing air, a combustion section for heating the compressed air by burning fuel therein, and a turbine section for expanding the heated and compressed gas discharged from the combustion section.

The hot gas flow path of the turbine section of a gas turbine is comprised of an annular chamber contained within a cylinder and surrounding a centrally disposed rotating shaft. Inside of the annular chamber are alternating rows of stationary vanes and rotating blades arrayed circumferentially around the annular chamber. Hot gas discharged from the combustion section of the gas turbine flows over these vanes and blades. Since, to achieve maximum power output, it is desirable to operate the gas turbine so that this gas temperature is as high as feasible, the vanes and blades must be cooled. Cooling is obtained by causing relatively cool air to flow within and over the vanes and blades. To facilitate such cooling of the vanes, a hollow cavity is provided inside of each vane. The cavity is enclosed by the walls which form the airfoil portion of the vane. Cooling air enters the hollow cavity from an opening on the outboard end of the vane. The cooling air flows through the hollow cavity and then leaves the vane by flowing through holes in the walls of the vane enclosing the cavity. After discharging from these holes, the cooling air enters and mixes with the hot gas flowing over the vanes.

To adequately cool the vane it is necessary to guide the cooling air flowing through the cavity to ensure that it is properly distributed over the entire surface of the walls forming the cavity. This distribution is accomplished by installing a thin-walled vessel, referred to as an insert, into the cavity. After entering the vane, the cooling air flows into the insert and is distributed around the cavity by a plurality of small distribution holes dispersed throughout the insert.

Since to be effective the cooling air must be pressurized, it is bled from the compressed air discharged from the compressor. If the gas turbine is operating in a dirty or dusty environment, small particles entrained in the compressed air become deposited and accumulate in the small distribution holes in the insert, thereby plugging the holes. As a result, the ability of the insert to properly distribute the cooling air is impaired.

It is therefore desirable to provide an apparatus which will prevent plugging of the cooling air distribution holes in the vane insert.

SUMMARY OF THE INVENTION

Accordingly, it is the general object of the present invention to provide a method and apparatus for cooling a gas turbine vane.

More specifically, it is an object of the present invention to ensure proper distribution of cooling air within a gas turbine vane by preventing the plugging of holes in an insert used to distribute cooling air throughout the vane.

Briefly these and other objects of the present invention are accomplished in a gas turbine having a plurality of stationary turbine vanes. Each vane is cooled by cooling air and has a cavity formed within it to facilitate cooling. An insert is disposed in the cavity to distribute the cooling air throughout the cavity by causing it to flow through a plurality of small holes dispersed throughout the insert. Plugging of these small holes by particles entrained in a cooling air is prevented by bleeding a portion of the air out of the cavity, the bleed air carrying with it the particles which entered the cavity along with the cooling air. Bleeding is accomplished through a tube which connects a large hole in the insert to a manifold formed on the inner shroud of the vane. From the manifold the bleed air is discharged into the hot gas flowing downstream of the vane through a hole in the inner shroud.

DESCRIPTION OF THE PREFERRED EMBODIMENT

Figure 1:
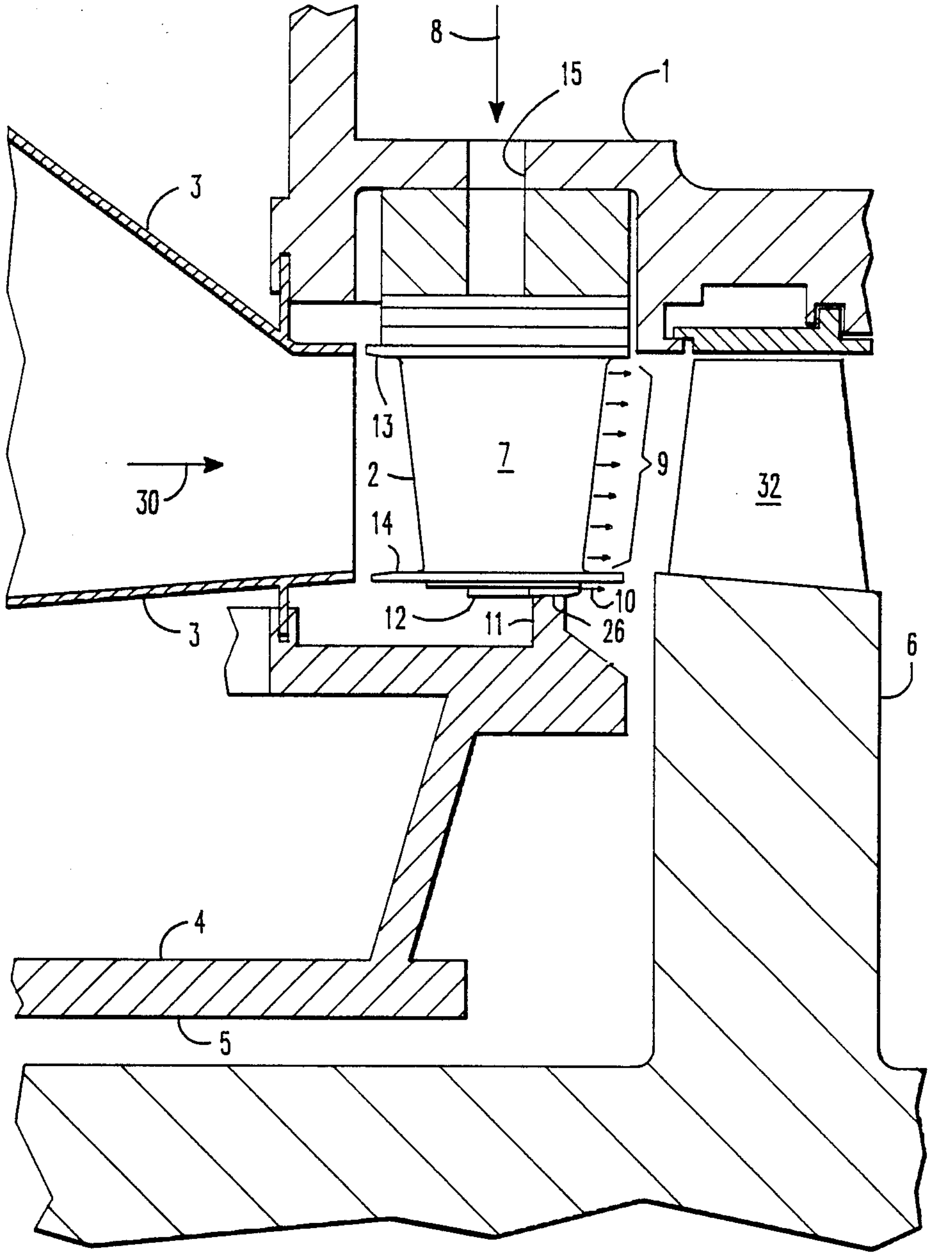
FIG. 1 is a longitudinal cross-section of a portion of the turbine section of a gas turbine, showing a first row stationary vane.
Figure 5:
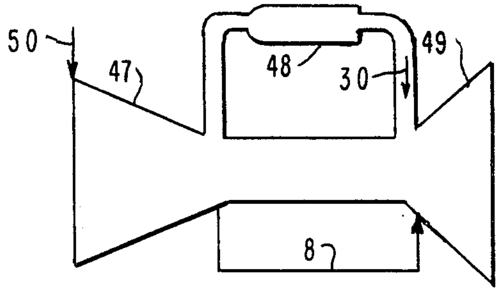
FIG. 5 is a schematic representation of a gas turbine.

Referring to the drawings, wherein like numerals represent like elements, there is illustrated in FIG. 5 a schematic representation of a gas turbine. The gas turbine is comprised of a compressor section 47, a combustion section 48 and a turbine section 49. Atmospheric air 50 enters the compressor and exits as compressed air. The majority of the compressed air 8 is heated in the combustion section and forms the hot gas 30 which enters the turbine. A portion of this compressed air is bled for cooling purposes as explained below. There is shown in FIG. 1 a portion of the turbine section of a gas turbine in the vicinity of the row 1 stationary vanes 7. A plurality of vanes are contained within a turbine cylinder 1 and are circumferentially arrayed around the turbine in a row. At the radially outboard end of each vane is an outer shroud 13, and at the radially inboard end an inner shroud 14. The portion of the vane between the shrouds comprises an airfoil 2. The inner and outer shrouds of each adjacent vane abut one another so that when combined over the entire row, the shrouds form a short axial section of the annular chamber through which the hot gas 30 flows.

A shaft 5 forms a portion of the turbine rotor in the vicinity of the first row vanes 7 and is encased by a housing 4. Gas 30, which has been compressed in a compressor section and heated by burning fuel in a combustion section, neither in FIG. 1 of which are shown, is directed to the first row vanes by a duct, or transition 3. The first row vanes form the inlet to the turbine.

Immediately downstream of the first row vanes are the first row rotating blades 32. The blades are affixed to a disc 6 which also forms a portion of the turbine rotor.

The vanes 7 are cooled by compressed air 8 bled from the compressor discharge air through a bleed pipe, not shown. This cooling air 8 penetrates the turbine cylinder 1 and retainer block attached thereto, through a plurality of holes 15, and enters the vanes. The majority 9 of the cooling air is discharged through holes in the trailing edges of the vanes and mixes with the hot gas downstream of the vanes. However, according to the present invention, a portion 10 of the cooling air is bled from the vanes and discharged into the hot gas flowing downstream of the vanes in the vicinity of the inner shroud.

Since the static pressure of the hot gas downstream of the vanes is lower than that upstream of the vanes, there is a tendency for the hot gas to bypass the vanes by flowing along a path inboard of the inner shrouds, i.e., by flowing through the gap between the housing 4 and the inner shrouds 14. This is prevented by a seal 11 disposed in the housing 4. The seal is spring loaded and bears against the downstream portion 26 of the inner surface of the inner shroud, thereby blocking the flow of hot gas through the gap between the housing and the inner shrouds.

Figure 2:
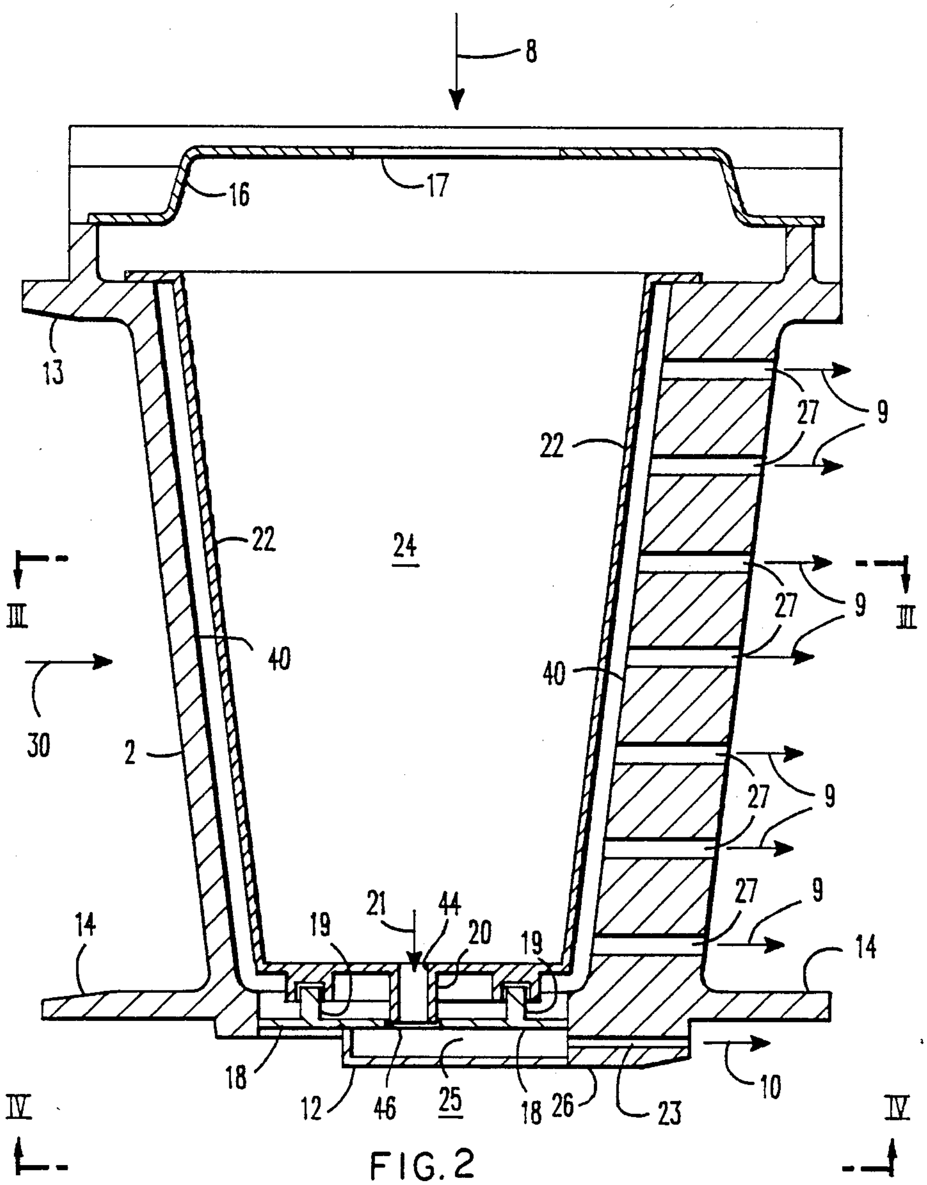
FIG. 2 is an enlarged longitudinal cross-section of the first row stationary vane shown in FIG. 1.
Figure 3:
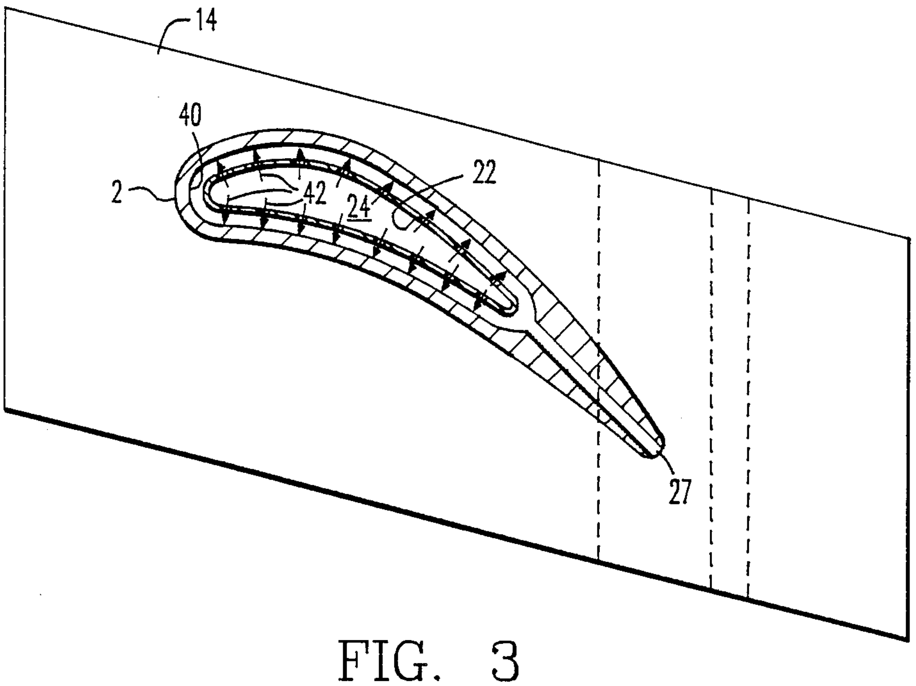
FIG. 3 is a cross-section of the vane shown in FIG. 2 taken through line III—III of FIG. 2.

Referring now to FIG. 2, the internal portion of a vane 7 can be seen. A hollow cavity 24 is formed inside of the airfoil portion 2 of the vane. A thin-walled vessel 22 referred to as an insert, is disposed within the cavity. The outboard end of the insert is affixed to the outer shroud 13 and the inboard end is: supported by pins 19 which protrude from a closure plate 18. The closure plate forms a portion of the inner shroud and seals the inboard end of the cavity. A closure cap 16 seals the cavity at the outer shroud 13. Cooling air 8 enters the vane through a hole 17 in the closure cap 16. Referring also to FIG. 3, a plurality of small distribution holes, are dispersed throughout the insert 22 so that the majority of the cooling air is distributed into numerous small jets of air 42 which impinge on the inner surfaces 40 of the walls forming the airfoil portion 2 of the vane. The diameter of these small distribution holes is typically in the range of 0.030 to 0.040 inch. After flowing over the inner surfaces 40 of the walls, this portion 9 of the cooling air exits the vane through a plurality of holes 27 in the walls forming the downstream edge of the airfoil, thereby cooling the downstream edge. It should be noted that since the cooling air is bled from the compressor discharge, its static pressure is higher than that of the hot gas flowing downstream of the vanes. A portion of the pressure drop between the cooling air and the hot gas is consumed in flowing through the small distribution holes in the insert and a larger portion is consumed in flowing through the holes 27 in the airfoil.

As previously discussed, if the gas turbine is operating in a dusty or dirty environment, particles entrained in the cooling air are sometimes deposited in the small distribution holes in the insert 22 and accumulate until the holes become plugged. As result of this plugging, the cooling air is not properly distributed around the inner surfaces 40 of the airfoil walls, causing local overtemperature of the airfoil walls (hot spots). These hot spots result in deterioration of the material forming the airfoil walls and shorten the useful life of the vane.

Referring again to FIG. 2, it can be seen that in accordance with the present: invention, air 21 is bled from the cavity 24 through a hole 44 at the inboard end of the insert 22. The bleed air 21 carries the particles entrained in the cooling air out of the cavity, preventing them from plugging the distribution holes. A hole 46, radially aligned with hole 44, is provided in the closure plate 18. The bleed air is directed through hole 46 by a tube 20. One end of the tube is affixed to the insert at hole 44 and the other end penetrates into hole 46 in the closure plate. After passing through the closure plate 18, the bleed air enters a manifold 25 from which it exits the vane through passageway 23 in the inner shroud. In effect, passageway 23 transports the bleed air past the seal 11, shown in FIG. 1, so that it discharges into the lower pressure zone downstream of the vane where it mixes with the hot gas, as previously explained.

Figure 4:
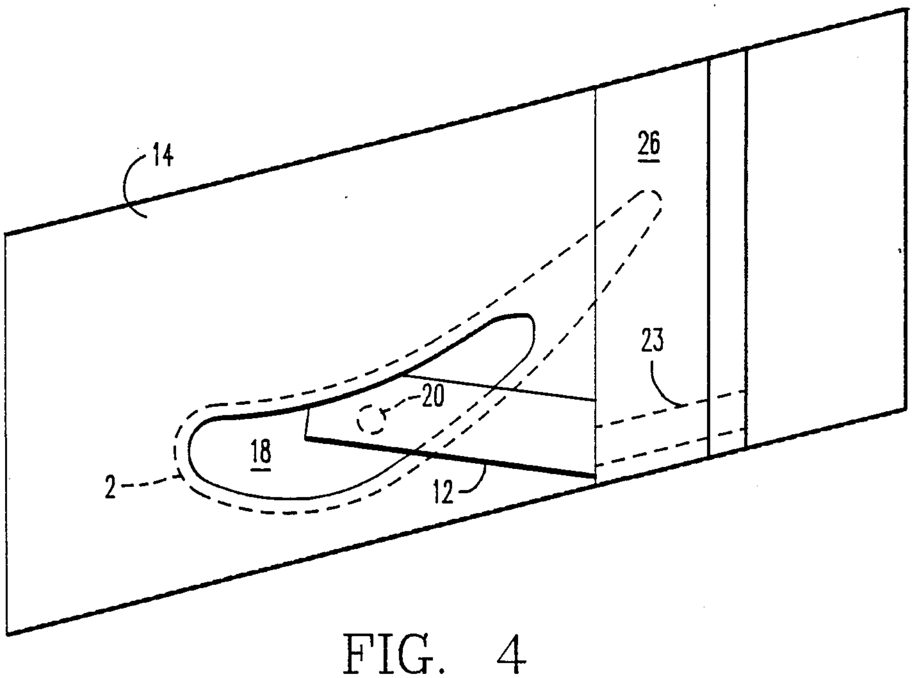
FIG. 4 is a plan view of the inner surface of the inner shroud of the vane shown in FIG. 2 taken through line IV—IV of FIG. 2.

FIGS. 2 and 4 show a containment cover 12 which forms the manifold 25 and encloses a portion of the inner surface of the inner shroud 14 upstream of the portion 26 of the inner shroud upon which the seal 11 bears.

In accordance with the invention, the diameter of bleed hole 44, and the inside diameter of tube 20, is in the range of four to six times larger than the diameter of the small distribution holes in the insert and they permit about 10% to 15% of the air supplied to the insert to be bled from the vane. The pressure drop between the air inside the insert and the hot gas flowing downstream of the vane to which the air is bled is larger than the pressure drop across the small distribution holes as a result of the aforementioned large pressure drop across the holes 27 in the downstream edge of the airfoil. As a result of the large bleed air pressure drop, due to the large size of bleed hole 44 and the significant quantity of cooling air bled, the particles entrained in the cooling air are preferentially bled from the insert and do not accumulate around the small distribution holes.

In addition, it should be noted that the flow area of the manifold 25 and the passageway 23 are larger than that of bleed hole 44, thus insuring that the bleed hole controls the quantity of cooling air bled from the insert. Also the diameter of hole 17 in the closure cap 16 is increased so that additional cooling air enters the vane, thereby compensating for the air bled from the insert.

I claim:

1. A gas turbine comprising:

(a) a compressor section for compressing air, (b) a combustion section for generating hot gas by burning fuel in compressed air, said combustion section connected to said compressor section, (c) a turbine section for expanding hot gas, said turbine section connected to said combustion section, (d) a plurality of stationary vanes contained within said turbine section, said vanes circumferentially disposed in a row surrounding a rotating shaft, said vanes forming annular flow paths through which said hot gas flows, each of said vanes having a cavity formed therein, (e) cooling means for supplying cooling air to said cavities in said vanes, said cooling air having dust particles entrained therein, (f) a vessel disposed in each of said cavities, each of said vessels having means for receiving said cooling air, each of said vessels having a plurality of cooling flow paths dispersed throughout said vessel, a first portion of said cooling air received by said vessels flowing through said cooling flow paths, the size of each of said cooling flow paths being sufficiently small to allow said dust particles to plug said cooling flow paths by accumulation, and (g) a bleed flow path for each of said vessels through which a second portion of said cooling air received by said vessel flows, the flow area of each of said bleed flow paths being sufficiently large relative to the flow area of each of said cooling flow paths so as to form a preferential flow path for said dust particles.

2. The gas turbine according to claim 1 wherein each of said cooling flow paths is comprised of a first hole, the diameter of each of said first holes being in the 0.030–0.040 inch range.

3. The gas turbine according to claim 2 further comprising:

(a) an outer shroud formed at the outboard end of each of said vanes, each said vane being carried on a respective outer shroud, (b) a hole disposed in each of said outer shrouds for enabling said cooling air to enter said cavities, and (c) an inner shroud formed at the inboard end of each of said vanes, each of said inner shrouds having an inner surface.

4. The gas turbine according to claim 3 wherein each of said bleed flow paths comprises a manifold for each of said inner shrouds, each of said manifolds disposed at said inner surface of its respective inner shroud.

5. The gas turbine according to claim 4 wherein each of said manifolds is comprised of a containment cover enclosing a portion of the inner surface of each of said inner shrouds.

6. The gas turbine according to claim 4 wherein each of said bleed flow paths further comprises a hole disposed in each of said inner shrouds, each said hole enabling communication of said cooling air in said cavity with a respective said manifold.

7. The gas turbine according to claim 6 wherein the static pressure of said cooling air in each cavity is higher than the static pressure of said hot gas flowing downstream of said vanes.

8. The gas turbine according to claim 7 wherein each of said bleed flow paths further comprises communicating means for enabling said cooling air in said manifolds to discharge into said hot gas flowing downstream of said vanes.

9. The gas turbine according to claim 8 further comprising seal means for preventing said hot gas from flowing along a path inboard of said inner shrouds.

10. The gas turbine according to claim 9 wherein said communicating means comprises a passageway in each of said inner shrouds, each of said passageways enabling said cooling air in said manifolds to flow past said seal means.

11. The gas turbine according to claim 1 wherein the minimum diameter along each of said bleed flow paths is in the range of four to six times larger than the diameter of each of said cooling flow paths.

12. The gas turbine according to claim 1 wherein each of said bleed flow paths is sized so that the flow area of each of said bleed flow paths relative to the flow area of each of said cooling flow paths is such that the portion of said cooling air supplied to each of said vanes that flows through each of said bleed flow paths is in the range of 10% to 15% of said cooling air supplied to each of said vanes.

13. In a gas turbine having a turbine cylinder containing a plurality of stationary vanes over which hot gas flows, each of said vanes having an inboard end, an inner shroud formed at said inboard end, a portion of each of said vanes forming an airfoil, each of said airfoils formed by walls enclosing a cavity, an insert disposed in each of said cavities, each of said inserts having an inboard end and an outboard end, cooling air being supplied to said outboard end of each of said inserts, said cooling air being compressed atmospheric air in which dust particles are entrained when said gas turbine is operating in a dusty environment, a plurality of first holes dispersed throughout each of said inserts, a first portion of said cooling air being distributed throughout each of said cavities via said first holes, the diameter of said first holes being sufficiently small to allow said first holes to become plugged as a result of accumulation of said entrained particles, a plurality of second holes disposed in said walls forming said airfoils whereby said cooling air in each of said cavities communicates with said hot gas that has flowed over said vanes, an apparatus for preventing said particles entrained in said cooling air from plugging said first holes in said inserts comprising means for bleeding a second portion of said cooling air from each of said inserts to said hot gas flowing downstream of said vanes, said bleeding means having a third hole disposed in said inboard end of each of said inserts, the diameter of each of said third holes being sufficiently large relative to the diameter of said first holes so that said particles flow preferentially through said third holes.

14. The apparatus of according to claim 12 wherein said bleeding means further comprises:

(a) a fourth hole in each of said inner shrouds, said fourth holes radially aligned with said third holes in said inserts, and (b) means for operatively connecting said fourth holes in each of said inner shrouds with said third holes in each of said inserts.

15. The apparatus according to claim 14 wherein said connecting means comprises a tube for each of said third holes in said inserts, each of said tubes having first and second ends, said first end fixed to said inboard end of said insert and surrounding said third hole, said second end of said tube penetrating through said fourth hole in said inner shroud, the inside diameter of each of said tubes being four to six times larger than the diameter of said first holes.

16. The apparatus according to claim 13 wherein the diameter of each of said third holes is four to six times larger than the diameter of said first holes.

17. In a gas turbine having a turbine cylinder containing a plurality of stationary banes over which hot gas flows, each of said vanes having an inboard end, an inner shroud formed at said inboard end, a portion of each of said vanes forming an airfoil, each of said airfoils formed by walls enclosing a cavity, an insert disposed in each of said cavities, each of said inserts having an inboard end and an outboard end, cooling air being supplied to said outboard end of each of said inserts, a plurality of first holes dispersed throughout each of said inserts whereby said cooling air is distributed throughout each of said cavities, a plurality of second holes disposed in said walls forming said airfoils whereby said cooling air in each of said cavities communicates with said hot gas that has flowed over said vanes, an apparatus for preventing particles entrained in said cooling air from plugging said first holes in said inserts by bleeding a portion of said cooling air from each of said inserts comprising:

(a) a third hole in each of said inserts, said third holes disposed in said inboard end of each of said inserts, said third holes being larger than said first holes, whereby a portion of said cooling air and said entrained particles are bled from said inserts through said third holes, the diameter of each of said third holes being sized so that said portion of said cooling air bled is in the range of 10% to 15% of said cooling air supplied to said outboard end of each of said inserts, and (b) means for directing said cooling air bled from said third holes in each of said inserts to said hot gas downstream of said vanes.

18. A method of cooling a gas turbine vane comprising the steps of:

(a) supplying cooling air to said vane, (b) collecting said cooling air supplied to said vane in a vessel disposed in a cavity in said vane, (c) distributing a first portion of said cooling air throughout said cavity by flowing said cooling air through a plurality of small holes in said vessel, thereby cooling said vane, (d) flowing said first portion of said cooling air, after said distribution throughout said cavity, through a plurality of holes connecting said cavity with an exterior surface of said vane, thereby further cooling said vane, and (e) bleeding a second portion of said cooling air from said vessel through a large hole in said vessel, thereby removing particles entrained in said cooling air, said second portion of said cooling air comprising 10% to 15% of said cooling air supplied to said vane.

* * * * *